Figure 1:
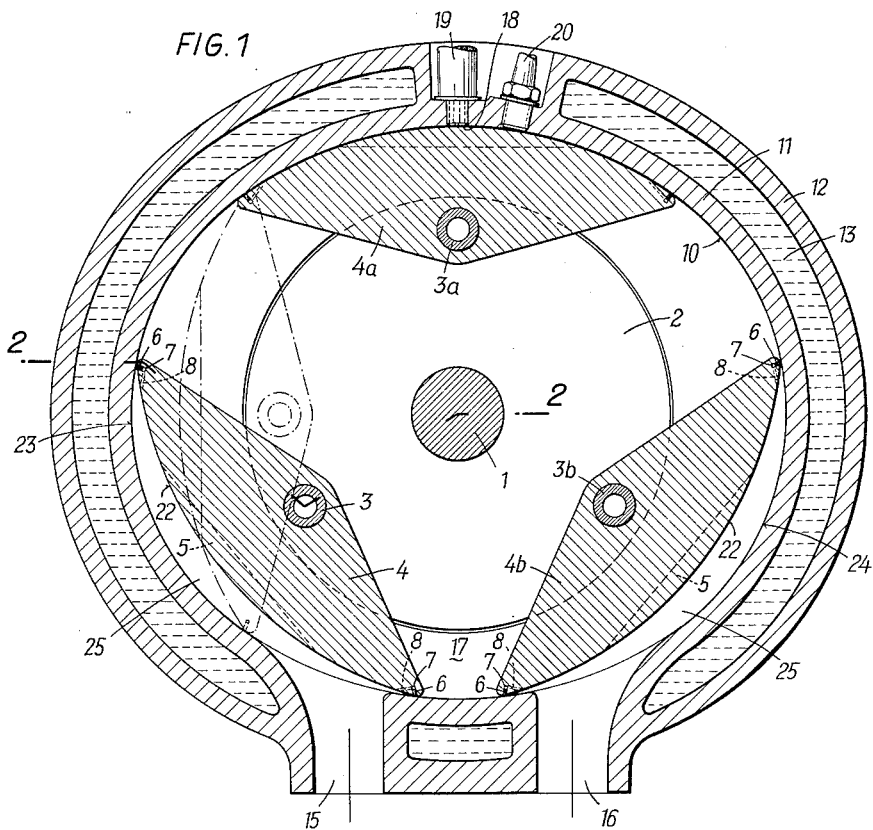

May 29, 1962  J. GEIGER  3,036,560

ROTARY PISTON INTERNAL COMBUSTION ENGINES

Filed Dec. 30, 1960

INVENTOR.
Johann Geiger
BY Ernest G Montague
Attorney

United States Patent Office 3,036,560
Patented May 29, 1962

3,036,560
ROTARY PISTON INTERNAL COMBUSTION ENGINES
Johann Geiger, Triesterstrasse 262, Vienna-Siebenhirten, Austria
Filed Dec. 30, 1960, Ser. No. 79,685
Claims priority, application Austria Jan. 4, 1960
3 Claims. (Cl. 123—17)

The present invention relates to a rotary piston internal combustion engine, particularly with fuel injection, of that type in which in a cylindrical working chamber of oval cross section two or more piston bodies revolve which are journalled on a hub portion fixedly mounted on the shaft and upon their rotation form working spaces periodically changing their capacity. These working chambers vary periodically between a minimum and a maximum and serve for effecting the suction, the compression, the expansion and the exhaust.

The present invention has the main object of dispensing with spring biased or otherwise longitudinally loaded slider vanes slidably mounted in the said hub portion, as hitherto used which are subject to considerable friction losses and wear.

It is another object of the invention to provide a rotary piston internal combustion engine which is of simple, inexpensive and sturdy construction, and of a substantially uniform run even with the use of a single cylinder.

With these and other objects in view which will become apparent later from this specification and the accompanying drawing, we provide a rotary piston internal combustion engine, comprising in combination: a cylindrical working chamber of oval cross section, an output shaft journalled in the centre of said working chamber, a hub portion fixedly mounted on said output shaft, at least two piston bodies each of segment-shaped cross section journalled on the said hub portion about angularly equally spaced axes parallel to said output shaft, and sealing elements mounted on the ends of the said piston bodies and over the entire revolution thereof slidably contacting the inner circumference of the said working chamber.

Preferably the radii from the axis of the said output shaft to the contact points of said sealing elements at the ends of each of the said piston bodies include an angle of substantially 90° between one another.

In a preferred embodiment of the invention the oval cross section of the said cylindrical working chamber is bounded by two opposite circular arcs of identical radii positioned at the ends of the larger diameter of said oval cross section and joined by two opposite identical curves of higher order having their apices at the ends of the shorter diameter of said oval cross section and having at their apices radii of curvature substantially exceeding in magnitude the radii of said circular arcs. Then the outer circumference of each of said segment-shaped pistons is curved according to a curve substantially identical with the said curves of higher order of said cylindrical oval cross section working chamber, and a recess is provided on the outer circumference of each of the said segment-shaped piston bodies enclosing the compressed gas mixture in the ignition positions of the said engine.

Preferably the sealing elements are sealing strips embedded in grooves of the piston bodies and slidable therein in directions radially with respect to the axis of the output shaft, and bores are provided in the piston bodies putting the bottom of the grooves in communication with a point on the outer circumference of the piston bodies between the two sealing strips thereof.

Figure 2:
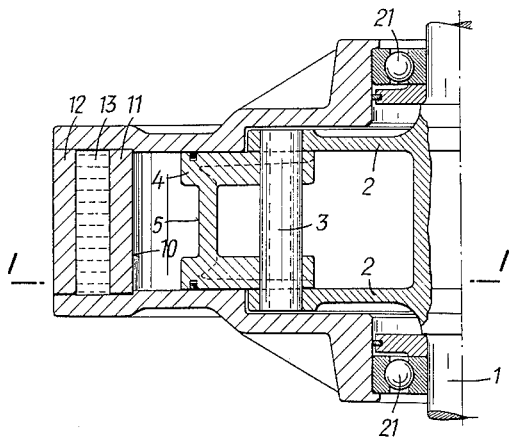

These and other features of our invention will be clearly understood from the following description of a preferred embodiment thereof given by way of example with reference to the accompanying drawings, in which:

FIGURE 1 is a cross section transversely of the engine shaft along the lines 1—1 of FIG. 2; and
FIG. 2 is a section along the lines 2—2 of FIG. 1.

Referring now to the drawing, on the centrally arranged engine shaft 1 two protruding discs 2 are fixedly mounted, on the outer circumference of which pivot pins 3, 3a and 3b are secured, which are parallel to the shaft 1 and have a mutual angular spacing of 120°. On these pivot pins 3, 3a and 3b cylinder segment-shaped piston bodies 4, 4a and 4b are journalled, the faces of which, averted from the shaft, have the shape of a shallow circular or elliptical arc, a groove 5 being however provided in the middle of the outer surface which groove 5 extends on both sides from the center over about one quarter of the width. Sealing strips 6 are inserted in corresponding grooves 7 at both ends of the piston bodies in such a manner that they stand approximately radially to the shaft 1 and may adjust themselves radially. The radii between the two contact points of the seals 6 of each of the piston bodies 4, 4a and 4b and the axis of the shaft 1 include between one another an angle of 90° or of approximately 90°. The inner end of the groove 7 is connected with the space lying outside the piston body by a fine bore 8 leading to the outer surface of the piston body.

The piston body contacts, over its entire path or rotation, with these seal strips an oval-cylindrical track 10, which forms the inner boundary of the casing 11. The casing 11 has moreover an outer shell 12 and a jacket 13, which is filled with cooling liquid. The parts required for the operation of the engine are provided on the oval track surface 10, which is composed of two opposite circular arcs on the longer half-axis joined to one another by curves of higher degree. At the suction port 15 the combustion air enters into the engine, and the exhaust is discharged through the exhaust port 16. These ports 15 and 16 are disposed symmetrically at both sides of one shallow apex 17 of the oval corresponding to the smaller diameter of the oval. On the opposite shallow apex 18 of the oval 10 the fuel injection nozzle 19 and at a short distance from it a sparking plug 20 are arranged. The shaft is journalled on the casing 11 in the usual manner by means of ball bearings 21. The outer boundary surface 22 of the pistons 4, 4a and 4b is so curved that it completely hugs the curvature of the shallow apex of the oval when the associated pivot pins 3, 3a and 3b are in justaposition with this apex. When now the pistons 4, 4a and 4b proceed in their movement, so that after a quarter revolution the pivot pin concerned is in juxtaposition with one of the apices 23 or 24, which correspond to the large diameter of the oval, a crescent-shaped chamber 25 is formed between the outer circumference 22 of the piston body and the inner surface 10, which space has its maximum in this position. The space 25 decreases upon continued rotation gradually almost to zero, when the piston body is again in a juxtaposition with one of the apices 17 or 18. Although the piston body hugs the curvature of the surface 10, there exists yet an interspace between the piston body and the running track 10, which is formed by the groove 5 in the middle of the piston body at the outside thereof and wherein the compressed mixture is contained in the ignition position.

The manner of operation is as follows:

Assuming the shaft 1 to rotate in the clockwise direction, the space enclosed between the surface 22 of the piston 4 and the running track 10 increases gradually from the position illustrated, whereby combustion air is aspirated through the suction port 15. Upon continued rotation of the piston body 4 from the position (indicated in chain dotted lines) in juxtaposition with the apex 23 to the position in which the piston is in juxtaposition with the apex 18 the interspace decreases almost to zero, and the air contained therein is strongly compressed. In this position, which corresponds to that of the piston body 4a in FIG. 1 of the drawing, the fuel is injected and is ignited immediately afterwards. The combustion gases can expand during the continued rotation of the piston 4a and exert a driving action. When passing beyond the juxtaposition with the apex 24 the exhaust port 16 is gradually cleared and the combustion gases may escape outward through the exhaust port 16.

At each revolution of the shaft 1 accordingly even with a single cylinder a three fold aspiration, compression, expansion and exhaust takes place, since there are three piston bodies having identical actions.

It is clear that by arrangement of more of these cylinders and groups of piston bodies on the shaft 1 likewise a six fold, nine fold or twelve fold cycle can be established so that the driving expansions take place at very short intervals in time and a practically completely uniform torque is generated.

The sealing strips 6 serving for the sealing of the working spaces between the surfaces 10 and 22 are pressed against the running track 10 by the pressure prevailing in these working spaces acting through the connecting ducts 8, so that their constant seal is ensured.

While we have herein described and illustrated in the accompanying drawing what may be considered a typical and particularly useful embodiment of our invention, we wish it to be understood that we do not limit ourselves to the particular details and dimensions described and illustrated; for obvious modifications will occur to a person skilled in the art, and the scope of the present invention being determined by the objects and the claims.

What I claim as my invention and desire to secure by Letters Patent, is:

1. A rotary piston internal combustion engine, comprising in combination, a working cylinder of oval cross-section defining a cylindrical working chamber of oval cross-section therein, an output shaft journalled in the center of said working chamber, a hub portion fixedly mounted on said output shaft, at least two piston bodies, each of the latter being of segment-shaped cross-section and journalled on said hub portion about angularly equally spaced axes disposed parallel to said output shaft, and sealing elements mounted on the ends of said piston bodies and slidably contacting the inner face of said working cylinder during the entire revolution thereof, the radii from the axis of said output shaft to the contact points of said sealing elements at the ends of each of said piston bodies forming an angle of substantially 90° there-between.

2. The rotary piston internal combustion engine, as set forth in claim 1, wherein said cylindrical working chamber is bounded by two opposite circular arcs of identical radii positioned at the ends of the larger diameter of said oval cross-section and said circular arcs are joined by two opposite identical curves of higher order having their apices at the ends of the shorter diameter of said oval cross-section and having at their apices radii of curvature substantially exceeding in magnitude the radii of said circular arcs, the outer circumference of each of said pistons being curved substantially complementary to said curves of higher order of said working chamber, and each of said piston bodies having a recess on its outer circumference, and said recess is adapted to receive a compressed gas mixture in the ignition position of said engine.

3. The rotary piston internal combustion engine, as set forth in claim 1, wherein said piston bodies have grooves at both ends, said sealing elements comprise sealing strips embedded in said grooves of said piston bodies and slidable therein in a direction disposed radially with respect to the axis of said output shaft, and said piston bodies have bores extending from the bottom of said grooves to the outer circumference of said piston bodies between said sealing strips.

References Cited in the file of this patent
UNITED STATES PATENTS

| | | |
|---|---|---|
| 741,359 | Morphew | Oct. 13, 1903 |
| 1,909,880 | Meyer | May 16, 1933 |
| 2,263,361 | Lawrence | Nov. 18, 1941 |
| 2,878,793 | Birk | Mar. 24, 1959 |